INVENTORS
THOMAS L. ALTSHULER
THOMAS E. HARR
GEORGE E. LEDGES

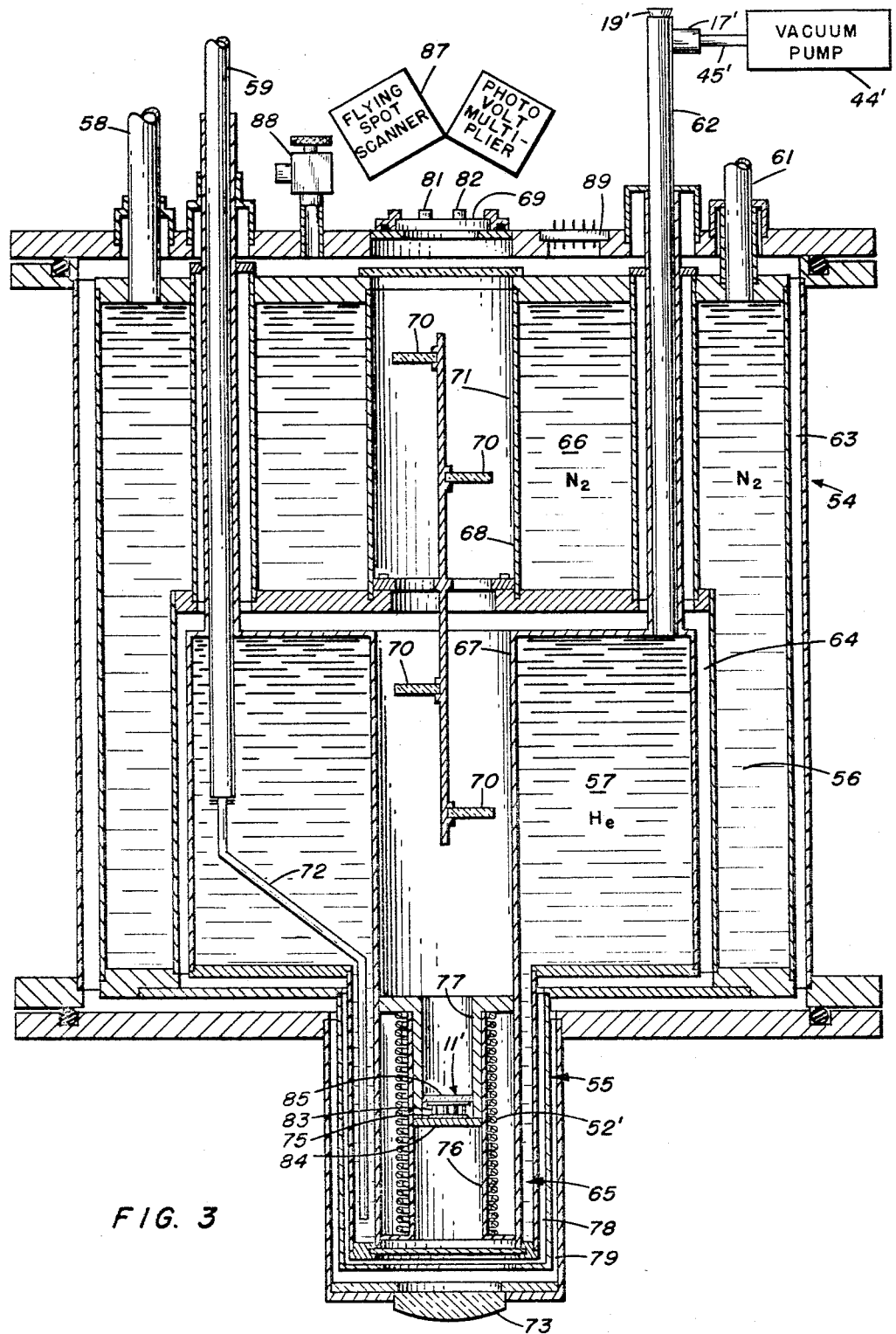

United States Patent Office 3,435,137
Patented Mar. 25, 1969

3,435,137
INFRARED CAMERA TUBE UTILIZING A SUPER-
CONDUCTOR MATERIAL DETECTOR
Thomas L. Altshuler, Wayne, Pa., Thomas E. Harr,
Orlando, Fla., and George E. Ledges, Dryden, N.Y.,
assignors, by mesne assignments, to the United States
of America as represented by the Secretary of the
Navy
Filed June 14, 1965, Ser. No. 463,974
Int. Cl. H04n 1/24; H03k 3/38, 3/42
U.S. Cl. 178—7.1                                13 Claims

ABSTRACT OF THE DISCLOSURE

A wide bandpass infrared camera in which the infrared sensitive detector consists of a mosaic of superconductive material, this superconductive material being located in an area of intense cold and within a magnetic field. When infrared radiation strikes the detector it causes the superconductor to pass from the transition zone into the normal conducting zone thereby permitting a portion of the magnetic field to pass through it. The magnetic field passed then causes rotation of a readout light in proportion to the received infrared radiation.

---

This invention relates to infrared camera tube apparatus of a character employing superconductive material as the infrared sensitive detector and to the method of operating the camera tube apparatus.

More particularly, the invention relates to an infrared sensitive detector of a character comprising a pure superconductive material contained in the confines of a uniform adjustable magnetic field.

More specifically, the detector element per se is fabricated in the form of a mosaic which permits each element of the mosaic to behave as an individual point detector with the resolution of the device being dependent among other things upon the size of the individual elements of the mosaic.

The invention further envisions the utilization of a unique electro-optical readout system in which neither electrical nor mechanical contact is made or required with respect to each individual element of the mosaic. The readout technique of the instant invention permits of the advantages of displaying imaging intelligence correlative to that of the area being observed by the detector element, at a location remote from the camera tube. This is accomplished by conventional readout or display apparatus incorporating a cathode ray tube. Thus, the visual picture of the area being observed by the detector may be viewed by the operator of a remote control console.

The invention is well adapted for use in any application in which thermal energy of any wave length is to be detected. It is envisioned that the device may be utilized in applications for terrain mapping, battleground surveillance, missile guidance, satellite surveillance, tracking of space vehicles, tracking of intercontinental ballistic missiles, and for the observation of meteors. It is equally as well adapted for observation of cosmic dust. Further, it displays the potential for mapping the dark side of the moon. A still further application envisioned for the device resides in its utilization in situations wherein the desired result is that of providing for differentiation of temperature gradients presented by targets which may be brought into focus within the viewing area of the camera tube.

Prior art camera tubes heretofore or now in general use are of a character which will display a picture of the area being observed, based on the energy radiating from it, but such devices possess the limitation that they will respond to only a narrow band portion of the electromagnetic spectrum. Camera tubes of this character include, among others, the infrared vidicon and various thermaimage detection systems of a character differing therefrom such, for example, as those disclosed in U.S. Letters Patent Nos. 3,072,819, 2,547,173, 2,816,232 and 3,067,283. Work has been undertaken previously to fabricate a superconducting bolometer in which the resistance of a one element superconductor as it undergoes transition from the superconducting to normal state is measured as a means of deriving an output therefrom. Attempts to use such a device have proven somewhat unsuccessful. Bolometer devices of this character have failed to provide a picture of the area being viewed due to the poor resolution resulting therefrom and the fact that its function is comparable to a point detector rather than a camera tube.

The instant invention envisions the utilization of a plurality of well known physical phenomena in a unique manner not heretofore utilized in prior art camera tubes, in order to obtain the various desired improvements in imaging and readout effects in a television type system. These physical phenomena, when coordinated in the desired manner by the structural embodiment of the instant invention, provide an over-all mutuality of cooperation therebetween and between a television viewing system of a nature overcoming substantially all of the shortcomings of systems heretofore or now in general use while obtaining most if not all of the most desired advantages of the individual prior art systems and devices.

In view of the foregoing, it is a feature of the instant invention to provide a new and novel wide band image detection and readout system for the infrared portion of the electromagnetic radiant energy spectrum.

One object of the instant invention resides in the provision of a wide band infrared camera tube providing improved response and imaging definition over systems heretofore available to those practicing in the art to which this invention pertains.

Another object of this invention resides in the provision of an improved camera tube of a character providing an output of an improved character and in which neither mechanical nor electrical contact is required with respect to the energy detection surface utilized for detection and readout.

It is also an object to utilize a detection device of a character utilizing the Faraday effect and Meissner effect in an improved detector device for optical readout of imageable infarared intelligence.

Another object of the invention resides in the provision of an improved camera tube of a super-conducting character in which the change in magnetic permeability phenomenon is employed as the mechanism by which detection of infrared imaging intelligence is accomplished.

Another object resides in the provision of a versatile cryostat structure by virtue of which a wide variety of modifications in the manner of operation of the novel superconducting camera tube may be accomplished without requiring a complete redesign and/or reconstruction of the apparatus.

Other objects and many of the attendant advantages of the instant invention will become apparent from the following detailed description of the invention when considered in conjunction with the accompanying drawings wherein:

FIG. 3 is a generally diagrammatic view in vertical section of a superconducting camera tube apparatus according to a preferred embodiment of the instant invention;

FIG. 15 is a three-dimensional diagram showing the interrelationships of the parameters indicated in the two-dimensional diagrams of FIGS. 13 and 14, FIG. 13 being portrayed as the plane BOH in FIG. 15 while FIG. 14 is portrayed as plane (ab) in FIG. 15;

Figure 17A:
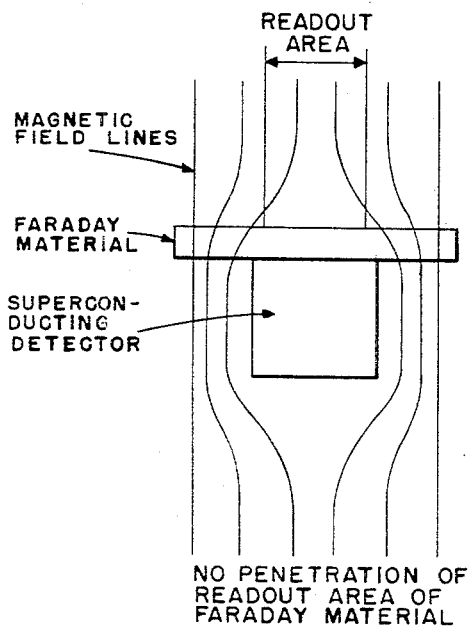
Figure 17B:
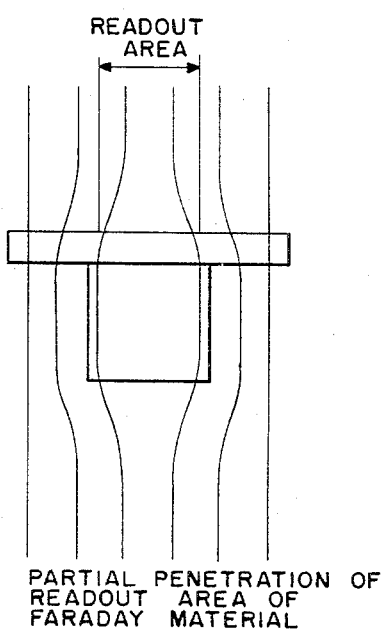
Figure 17C:
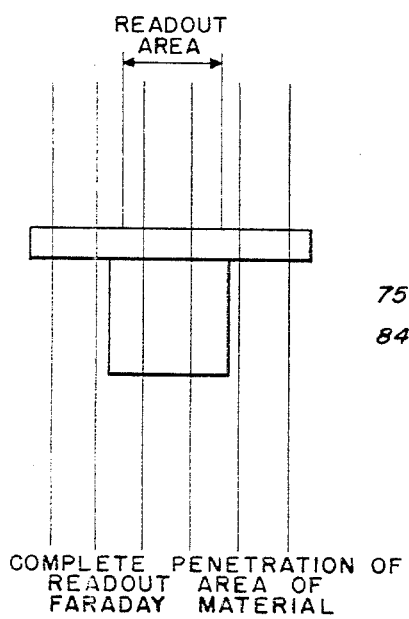
Figure 16:
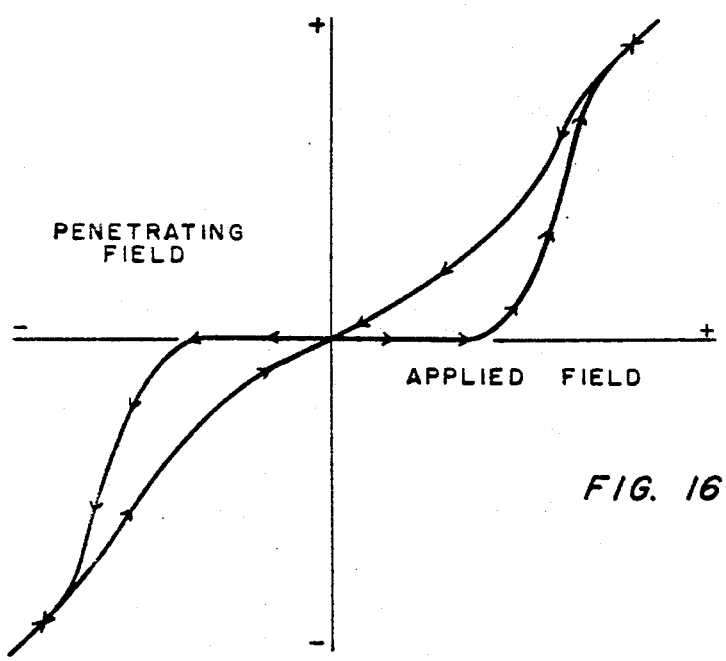

FIG. 16 is a graphical illustration diagrammatically indicating the manner in which the magnetic field is cycled after a complete mosaic of the detector of the instant invention has been scanned by a flying spot scanner for readout; the diagram further indicating the manner in which the image is erased and the detector prepared to again receive an image; and FIGS. 17a, 17b and 17c are a series of diagrammatic illustrations demonstrating the behavior of a superconductor utilized for the detecting element of the instant invention, when disposed in a magnetic field which behaves according to the Meissner effect.

Referring now to the drawings wherein similar reference characters are used for similar structure throughout the various figures, attention is initially directed to the diagrammatic illustration of certain of the drawings wherein certain of the physical characteristics of the detecting surface utilized with the instant invention will become more apparent by an initial treatment of certain of the relationships existent when a superconducting material is disposed in a television type readout device of the invention with the detection surface disposed within an external magnetic field to produce the desired readout.

Figure 11:
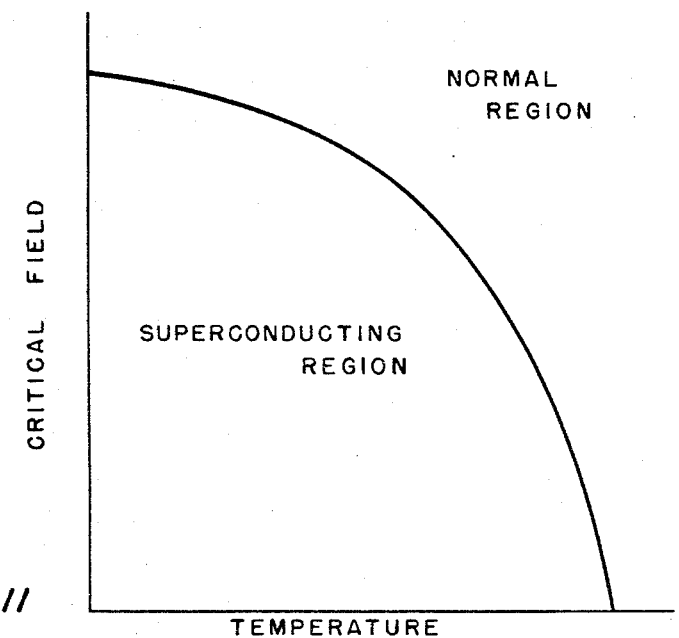
FIG. 11 is a graphical illustration of a curve indicating the critical field vs. temperature relationships of a suitable detecting material at its transition between the normal behavior region thereof and the superconducting region of its behavior as utilized in the instant invention.
Figure 12:
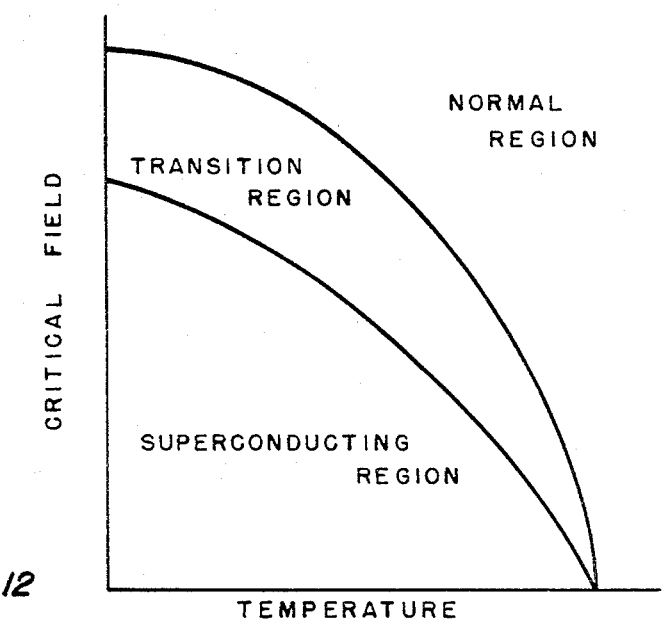
FIG. 12 is a diagrammatic illustration of the character of FIG. 11 and further illustrating, by the inclusion of an additional curve, the transistion region existent under certain controlled conditions between the normal temperature behavior region and the superconducting behavior region with various conditions of temperature near the critical temperature of the superconducting material.
Figure 13:
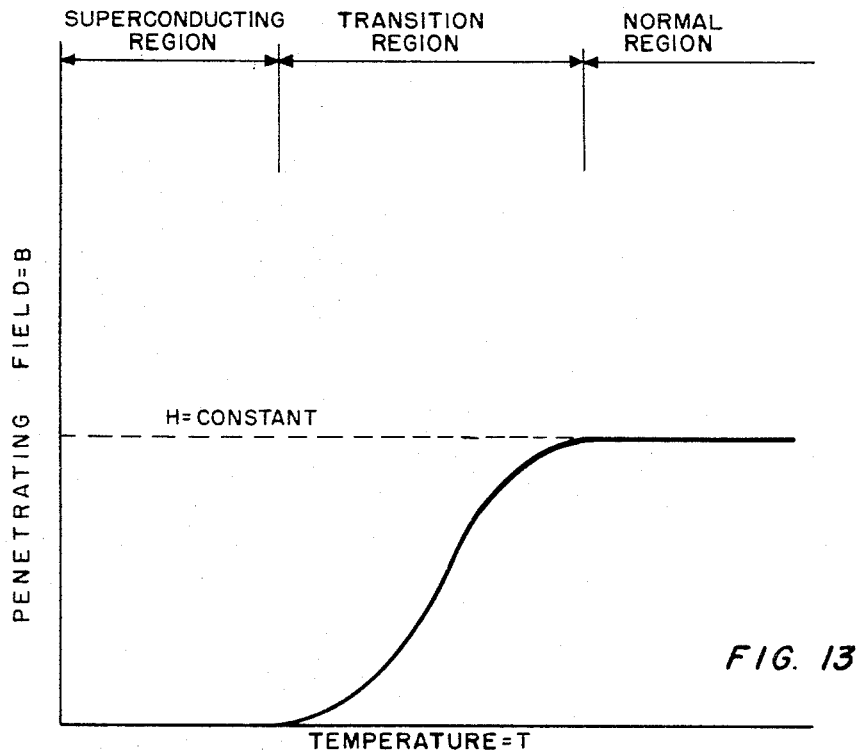
FIG. 13 is a diagrammatic illustration in graphical form illustrating the relationships existent with respect to the penetrating field produced during operation of the invention as a plot against changing temperature in the vicinity of the critical temperature of the superconducting detector material.
Figure 14:
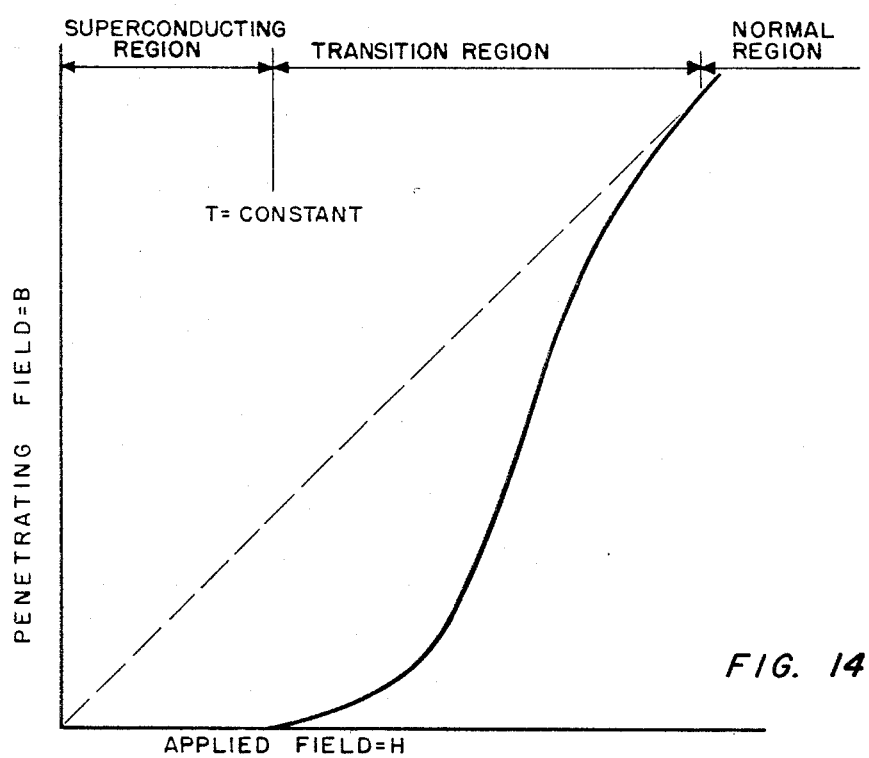
FIG. 14 is a graphical diagram of a typical curve indicative of the variations in penetrating field with changes in applied field as these changes occur in the range zones between absolute zero temperature and the normal behavior temperature region or zone.
Figure 15:
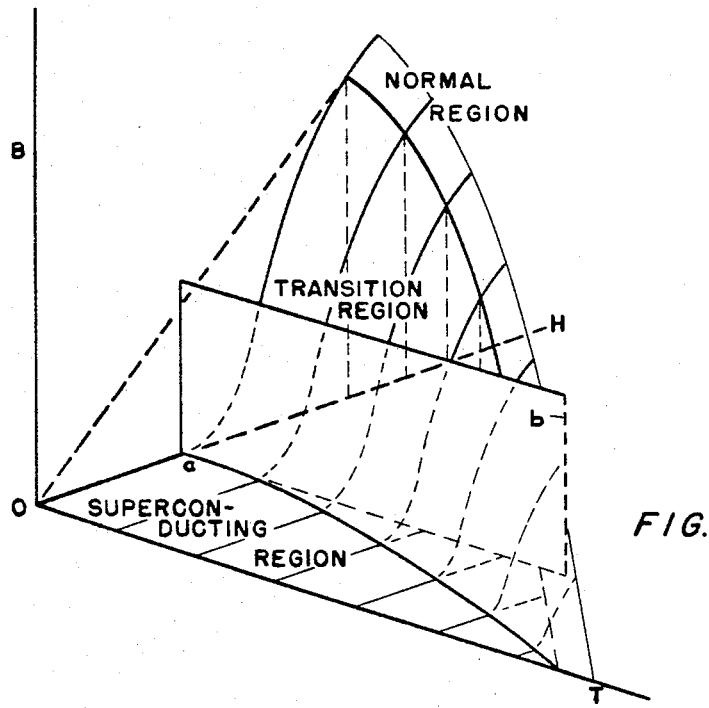

The temperature-critical field relationship for a number of materials has been determined experimentally and the general relationship for a typical pure, annealed bulk material is shown in FIG. 11. The relationship between the critical field and temperature for a strained thin film of the superconductor or the bulk material in unannealed or impure condition is more appropriately indicated as shown in FIG. 12. It is to be noted that a transition region exists beginning at the critical temperature and broadening as the temperature decreases. The general relationship between applied field, penetrating field and temperature is indicated in FIGS. 13 and 14. A three dimensional diagram showing the interrelationships of these parameters is presented by FIG. 15.

Figure 1:
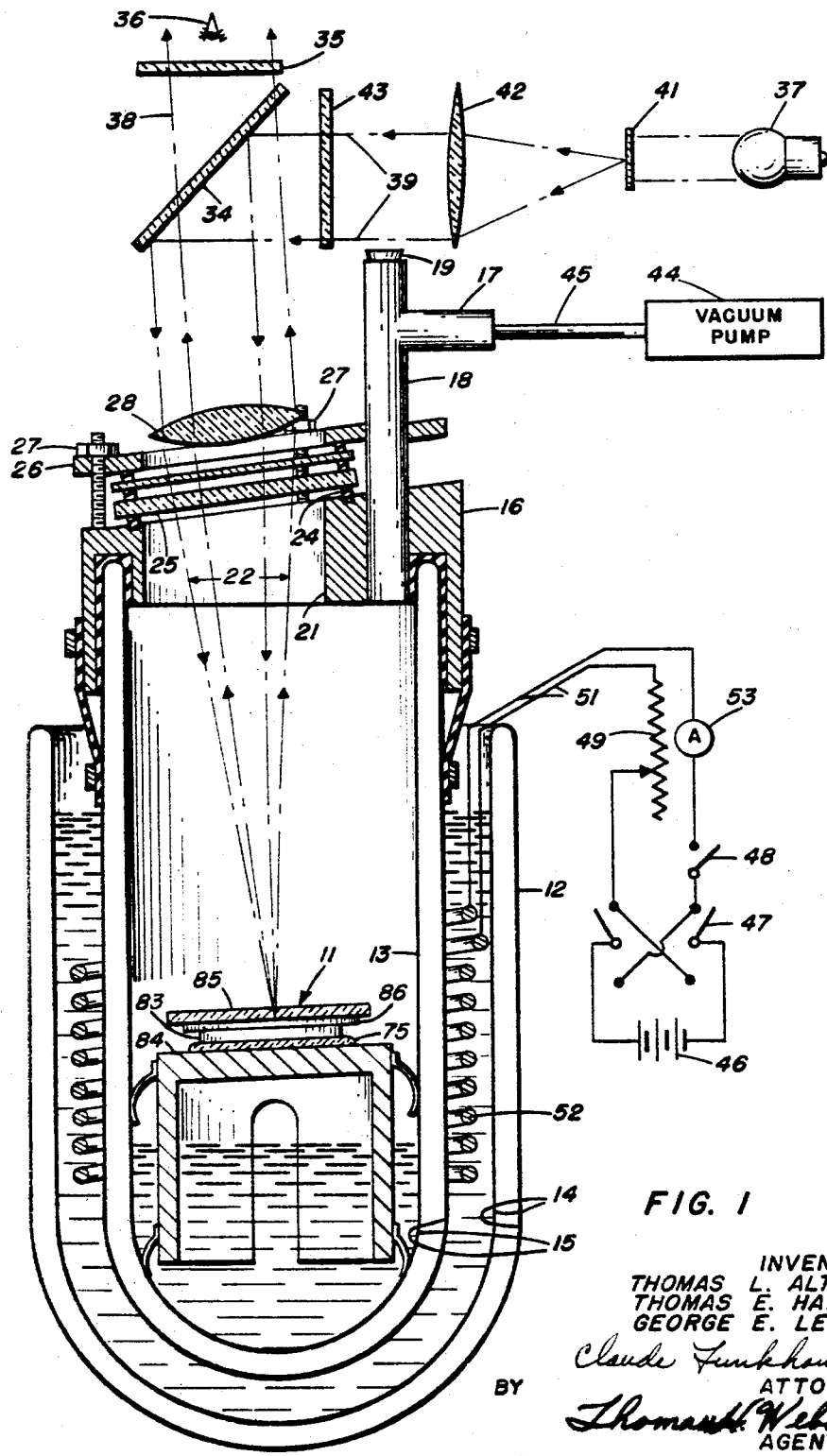
FIG. 1 is a diagrammatic view in vertical section illustrating a superconducting camera tube of the instant invention of a character having provisions for direct image viewing by the eye of the observer.
Figure 2:
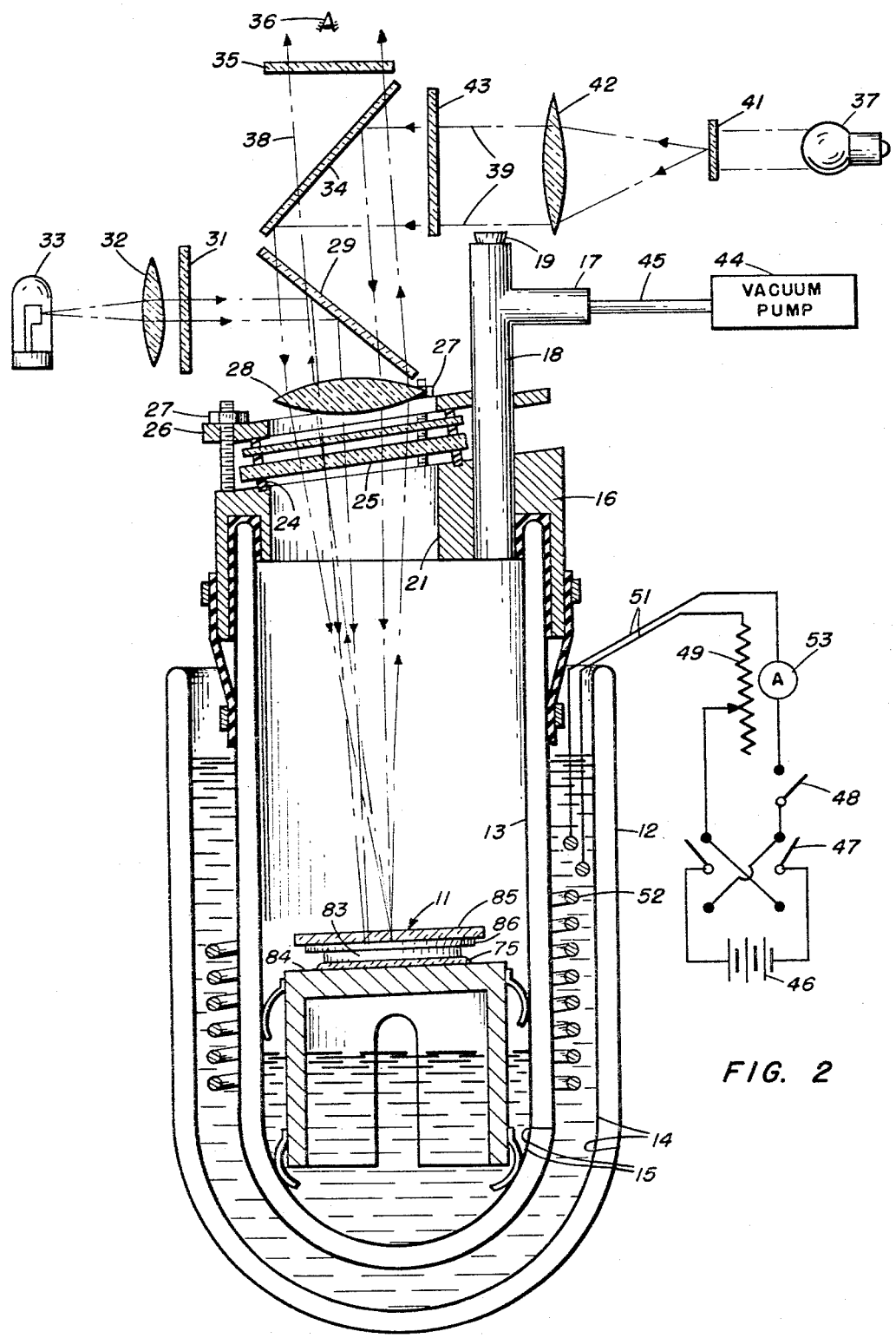
FIG. 2 is a generally diagrammatic view of a camera tube of the character of FIG. 1 and further indicating a source of infrared energy.

The detector assembly generally indicated by reference character 11 must be maintained at extremely low temperatures. Accordingly, it is necessary that it be contained in a cryostat-type device of a character capable of fulfilling this requirement. A set of glass Dewars of the character shown at 12 and 13 in FIGS. 1 and 2 are suitable for this purpose. The outer Dewar 12 employs liquid nitrogen as a thermal shield for the liquid helium contained in the inner Dewar 13. The surfaces 14 and 15, respectively, of the evacuated chambers of the Dewars 12 and 13 are coated with a reflective coating of any suitable material of a conventional character known in the art in order to minimize thermo loss of the cryogenic fluid. The inner Dewar 13 may also be provided with a cap 16, if desired.

FIGS. 7 through 10 are illustrative of a cap structure of a character which provides a capability for imaging on, and readout of, the detector from the top of the inner Dewar. This structure, as illustrated, also incorporates an exhaust port 17 and a filling port 18, although these need not necessarily be provided by the cap 16. A vacuum type plug for stopper 19, FIGS. 1, 2, 7 and 8, is secured in place after the filling of the inner Dewar 13 has been accomplished.

Figure 7:
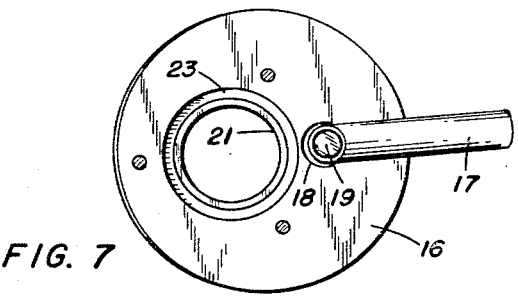
FIG. 7 is a plan view of a cap type device used as a cover for the Dewar utilized with a cryostat type device in accordance with one embodiment of the instant invention.
Figure 8:
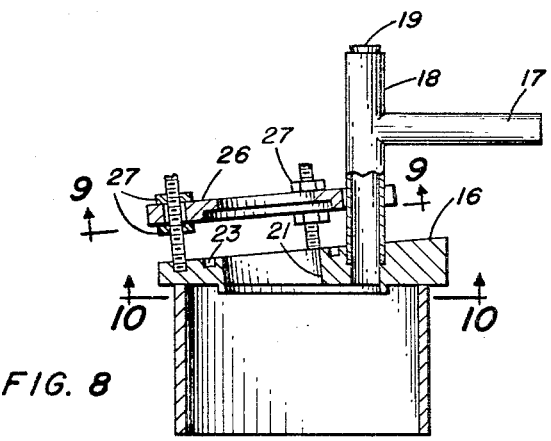
FIG. 8 is an elevation view with parts broken away and other portions thereof shown in section and illustrating additional details of the structure if the cover device of FIG. 7.
Figure 9:
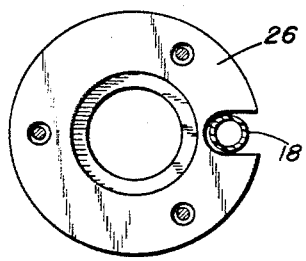
FIG. 9 is a plan view of a portion of the structure of the cover device of FIG. 8.
Figure 10:
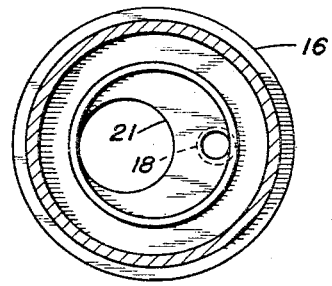
FIG. 10 is a sectional view of certain of the cover structure as taken along the line 10—10 of FIG. 8.

The cap 16 is provided with a bore at 21 for the passage therethrough of the optical beam generally indicated as 22, FIG. 1. An annular undercut 23 FIGS. 7 and 8 may be provided for reception of an O-ring 24, FIGS. 1 and 2 in order to provide a vacuum tight seal between the Dewar cover or cap 16 and the optical filter or transparent closure member 25. In this regard, it is to be noted that the clamp arrangements indicated in FIGS. 1 and 2 comprise three or more clamps, screws and nuts 27 as indicated by FIGS. 7, 8 and 9. The structure as shown is intended to be illustrative only and does not necessarily represent the particular structure for clamping the optical filters and inner Dewar transparent closure member 25 on Dewar cover 16 to retain these elements in place as would be utilized in actual practice to maintain the required vacuum tight seals between the respective parts. Additionally, it is to be noted that the lens and prism elements shown on FIGS. 1 and 2 are diagrammatic in nature. It is believed to be within the knowledge of one skilled in the art to which the instant invention pertains that these various optical means would be supported by suitable structure in lens amounts enclosed by a barrel or other type of housing arrangement for the purpose of excluding extraneous light therefrom.

The transparent closure member 25 may be of any transparent material of a character known in the art as having transmission characteristics corresponding to the spectral frequencies desired to be detected by the detector assembly generally indicated by reference character 11. If desired, the material may be selected to attenuate spectral frequencies outside of the desired pass band of the filter. Alternatively, the filter 31 may be and preferably is utilized for this latter purpose. It is also within the purview of this invention to select the characteristics of the various filter elements utilized therein to be mutually complimentary.

A retaining member mutually displaced from cover 16 as shown for purposes of clarity at 26, in FIG. 8, is provided with a suitable clamping assembly 27 to maintain a vacuum tight seal with and by virtue of a suitable O-ring which is assembled in the annular groove 23 at the top of the cover 16. If desired, a plurality of transparent elements may be utilized in the manner illustrated in FIGS. 1 and 2.

The optical readout elements utilized with the embodiment of FIG. 1 corresponds to the like designated elements of FIG. 2. Accordingly, the description of this structure is primarily directed to the showing of FIG. 2. The description is presented in a diagrammatic sense, sans housing structure as aforementioned, although it is to be understood that suitable supporting and mounting structure will be provided in an actual structural embodiment of the instant invention.

A bi-convex lens 28 is illustrative of a lens system for focusing the light beam passing therethrough onto the surface of the detector assembly 11. Lens 28 is disposed between a beam splitting mirror or prism 29 and the transparent element 25 in a manner to pass the plurality of light beams emanating from a source 33 of the infrared radiant energy as focused thereon by objective lens 32 and passed by optical filter 31 as well as the beam 39 emanating from the readout light source 37 transmitted by filter 41, focused by a collimating lens 42, polarized by element 43, reflected by a beam-splitting mirror or prism 34 and the polarity shifted readout beam generally indicated at 38, which may be viewed on a ground glass screen or the like, not shown, but located between the analyzer 35 and the eye of an observer, indicated at 36. This readout may also be accomplished by utilizing a pickup tube of a television camera assembly to provide a readout at a remote monitoring station on a television monitor receiver of a character well known in the art.

The light beam emanating from source 37 as passed through ground glass or water filter 41 and a collimating lens 42 is polarized by a polarized media 43 for reflection by the second beam splitting prism or half surfaced mirror 34 for subsequent passage through mirror 29 and lens 28 for impingement upon detector assembly 11.

A suitable source of suction, such for example as the vacuum pump indicated at 44, is connected in a well known manner to pipe 45 for fluid evacuation communication with port 17 of the cap 16.

A polarity reversible source of direct current energy from source 46 is applied to the energization circuit 51 for the field coil 52 disposed between the two Dewars 12 and 13. This energization circuit includes a reversing switch 47 of the double pole-double throw variety, a current measuring device such as an ammeter or the like as indicated at 53 and a voltage dropping device illustrated as a variable tap type resistance element 49. The purpose of the leads 51 and on-off switch 48 are considered to be obvious.

The details, purpose and manner of operation of the detector 11 will become more apparent from the description of the embodiment of FIG. 3.

A cross-sectional diagram of a more sophisticated cryostat is shown in FIG. 3. This cryostat constitutes a preferred embodiment of the instant invention in that it has been specifically designed and constructed for carrying out the method of the invention while providing additional experimental versatility and adaptability to modification for both laboratory and service type applications. Experimental versatility and adaptability to modification constitute prime considerations in its design. In this embodiment of the device, the infrared signals enter through the bottom to irradiate one side of the detector located in the lower cylindrical portion of the detector housing. The cryostat may be considered as being comprised of two sections which constitute the enlarged upper housing portion and the small lower portion.

The cryostat generally indicated at 54 is configured as a large upper portion and a lower portion 55 of somewhat reduced dimensional size. It incorporates a conventional Dewar structure comprising a liquid nitrogen reservoir 56 and a liquid helium reservoir 57. Provisions are incorporated therein for filling of the reservoirs by virtue of the inclusion of the respective filling tubes 58 and 59. The vacuum ports and associated vent tubes 61 and 62 facilitate the accomplishment of the filling operation for the two reservoirs, Vent tubes 61 and 62 may be used as vacuum ports for reducing the pressure over the liquid nitrogen or liquid helium, as the case may be, for lowering the boiling temperatures of these liquids below what can be obtained when they are subject to one atmosphere of pressure, provided, of course, that the filling tubes 58 and 59 are provided with a vacuum type plug for a stopper. Continuous vacuum insulation chambers are provided by suitable spacing of the walls of the inner and outer Dewars as indicated at 63 and 64. The small lower portion 55 of the cryostat serves to contain the detector assembly 11' together with the magnetic field producing coil 52'. The liquid helium contained in the chamber 57 is in fluid communication with the lowermost liquid helium Dewar portion generally indicated at 65.

Stainless steel has been fund to be a satisfactory material for the Dewar structure where thermal conductivity is not a prime consideration, while copper has been found most desirable for use as a structural material in situations wherein thermal conductivity is necessary.

The liquid helium storage chamber 47 of the cryostat is preferably capable of containing approximately two liters of helium. The top portion of the Dewar construction departs from that of units of conventional design in that it is comprised of essentially two sections connected by means of a large diameter tube which is provided at the center thereof for purposes of facilitating optical readout therethrough, and through the top of the cryostat closure 69.

The central column is also sufficiently large to facilitate the mounting of any desired optical element as indicated generally at 70. The inside wall 71 of this tube 68 may be, and preferably is, coated with a suitable material of a character well known in the art to which this invention pertains, for the purpose of reducing its emission characteristics. The helium chamber core tube 67 may also be coated in a similar manner to that at 71, if desired.

The helium transfer tube 59 and its reduced diameter portion 72 is employed for transferring liquid helium from an auxiliary container to reservoir 57. After the completion of the filling operation, a suitable plug or vacuum type stopper, not shown, is inserted in tube 59. Plug 19' provides a vacuum tight seal for tube 62. Conduits 17' and 45' provide communication with vacuum pump 44' for controlling the pressure of the helium in the helium chamber or reservoir 57 and thus control the temperatures therein.

The small lower portion of the cryostat at 55 is designed to accommodate the detector assembly 11' hereinafter to be described in greated detail. It is further designed to receive the field coil assembly 52' associated with the detector assembly 11'.

The detector assembly comprising detector elements 83, substrate 84 and thermal insulator 75 is shown supported by a sleeve 76 in the center of the tube 77 at a position approximately two inches above the bottom window or infrared lens 73 at the bottom of the lower portion 55 of the cryostat 54. Surrounding the detector assembly 11' and extending about 1½ inches on either side of it is a space of suitable dimension for accommodation of field coil 52'. The insulating vacuum chambers at 78 and 79 and the center cylinder vacuum chamber 64 are interconnected to form a continuous system and permit their evacuation with one common pumping system connected through a suitable valve as shown at 88. The closure for the center section of the cryostat is shown at 69. Two portholes diagrammatically indicated at 81 and 82 are provided in the closure 69; one is for a polarizer lens and the other one is provided for an analyzer lens for the flying spot scanner readout. The electrical terminal block shown diagrammatically at 89 is for use as required for electrical connections within the cryostat.

Figure 5:
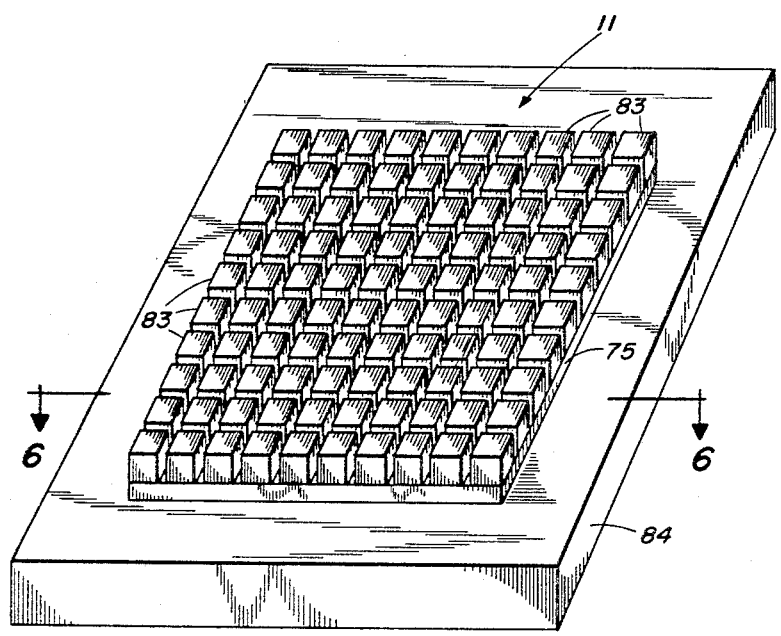
FIG. 5 is a view in oblique projection of a detection surface of mosaic form shown together with the detector substrate.
Figure 6:
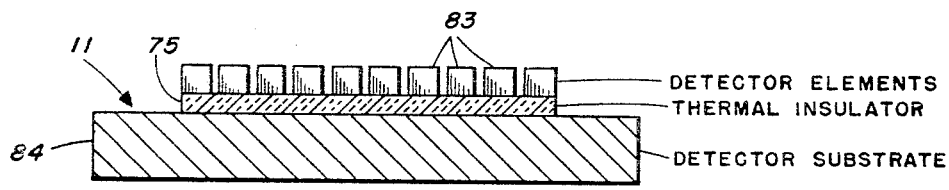
FIG. 6 is a sectional view taken along the line 6—6 of FIG. 5 which illustrates additional details of the detection element utilized with the instant invention.

The detector assembly 11 or 11', as the case may be, comprises a mosaic of superconducting material indicated at 83, FIG. 6. For the purpose of this disclosure, the geometric configuration of the elements of the mosaic are to be considered as a cube such as shown in FIG. 5. The size of the elements of the mosaic will be significant in that the smaller size elements will be more sensitive, and, accordingly, it will require less heat to transfer them from their superconducting state to their transition or normal states. It is thus deemed apparent that a required degree of resolution can be obtained with small sized detector assembly. The detector 11 is fabricated by employing a thin insulator 75 between it and its holder or support 84 in order to maintain a small thermal gradient between the elements 83 and the holder 84 and thereby avoid loss of thermal detection information before readout can be accomplished. Theoretically, any superconducting material should be usable as the detector surface. Tin is the material primarily utilized in the reduction to practice of the disclosed embodiment. Film type construction techniques may be utilized in the fabrication of the detector, if desired.

Throughout the balance of the specification, the terminology detector mechanism is utilized in a sense distinct from that of the detector assembly 11 in the strictly structural sense as related to the components comprising and mounting the same. This term is used to relate to the physical phenomena by which the various desirable operative characteristics of the invention are accomplished. The well known Meissner effect, which relates to the expulsion of a magnetic field by a superconducting material, is employed as the part of the detection mechanism of the instant invention. Reference to FIGS. 11 through 15 will provide a better understanding of the manner in which a superconductor behaves in a magnetic field in accordance wtih the Meissner effect. A superconductor can be maintained in a magnetic field and still remain superconducting, providing its temperature is below the critical temperature for the applied field. In this condition, the magnetic field lines are expelled from the superconductor as shown in FIG. 17a and caused to go around it. Under the condition where the element is maintained under conditions of temperature and applied field such that it is in the transition region, some penetration of the magnetic field will occur as indicated by the flow lines of FIG. 17b, when the conditions are altered to such an extent that the field completely penetrates the superconducting material as indicated in FIG. 17c. If the field is removed from the condition shown in FIG. 17c or the temperature of the element is caused to undergo a decrease such that it again becomes superconducting, the element will revert to the condition shown in FIG. 17a if the Meissner effect is followed.

Although a number of properties change as a material undergoes transition between the normal and superconducting states thereof, most of them require good electrical or physical contacts for measurement of this change of state. If the detector utilized is a mosaic consisting of a large number of very small closely spaced elements such as that employed in the instant superconducting camera tube, it is almost impossible to make the necessary contact with each element in order to measure its changes in properties and thus detect the target intelligence impinging thereon. The employment of the Faraday effect for measuring the magnetic permeability, however, provides a unique and convenient detection system, since it does not require the making of good electrical or physical contact with each and every element of the mosaic detector. This change in magnetic permeability of the superconducting element is detected by means of a Faraday material which is placed over the mosaic detector as indicated at 85 in FIG. 4. This material possesses the characteristic of being capable of rotating plane-polarized light in the presence of a magnetic field. In order to assist in the readout of image intelligence therefrom, the bottom surface of the Faraday material is coated with a reflective film at 86. The amount of rotation of polarized light obtained in the operation of the detector is dependent upon the characteristics of the Faraday material, its thickness, the temperature thereof, and the magnetic field to which it is subjected. Cerium nitrate dissolved in glycerol and cerium metaphosphate glass have been utilized in the carrying out of the instant invention and are typical Faraday materials suitable for practice of the instant invention.

Figure 4:
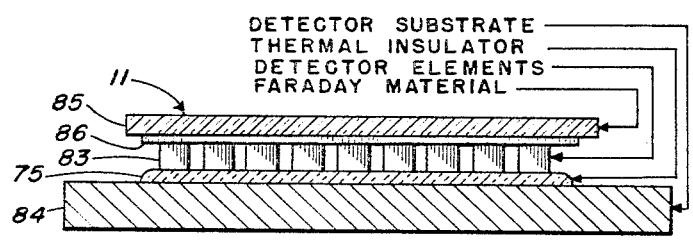
FIG. 4 is a diagrammatic view in section and on an enlarged scale of a detection surface for the camera tube apparatus according to and as utilized in carrying out the novel method of the instant invention.

Techniques used for readout of image intelligence from the superconducting camera tube of the instant invention employ an optical readout technique, which is much less "noisy" than electrical or magnetic readout arrangements heretofore utilized in the art to which this invention pertains. Referring again to FIG. 2 for a diagrammatic showing of a suitable readout arrangement, the readout light emanates from an incandescent source 37, passes through a ground glass or water filter 41, polarizer 43, suitable optics indicated at 42 and 28 and the Faraday material at 85 disposed on the top of the detector elements 83 of the detector assembly 11 as indicated in FIG. 4 to illuminate the entire detector area. The impinging light is reflected from the coating 86 on the bottom surface of the Faraday material. The light then passes back through the Faraday material, up through the readout optics indicated at 28, whereupon it passes through an analyzer at 35 which is rotated 90° with respect to the polarized type filter 43 and is imaged into a camera, television pickup tube or other suitable readout device indicated generally by the position of the eye of an observer 36 where the condition can be recorded photographically or as aforementioned by television readout techniques. The condition may, if desired, be visually observed through a ground glass screen, not shown, by the human eye.

A constant magnetic field is maintained in the detector area by virtue of the utilization of a coil 52, FIGS. 1 and 2. At such times as the detector elements are in the superconducitng state, the magnetic field does not penetrate the elements thereof. This provides a condition wherein the portion of the Faraday material directly above these elements is not subjected to any magnetic field. Thus, there is no occurrence of rotation of the polarized readout light by the Faraday material above the superconducting elements. In the event the detector elements are in the transition or normal states, rotation of the readout light is obtained above these elements which is proportional to the amount of flux penetrating them. The actual image detected is projected in a manner to be viewed by the eye or recorded on film by means of a camera. The degree of contrast obtained by the system of the instant invention represents various amounts of the magnetic penetration of the detector and thus the temperature variation of the target utilized to provide the image intelligence to which the system is subjected for readout usage.

An alternate method of reading out the superconducting camera tube of the instant invention employs a flying spot scanner 87 as the source of the readout light. Reference to FIG. 3 shows a diagrammatic illustration of an arrangement utilizing such a readout system. The light from this device electronically scans each individual element of the detector mosiac rather than continuously illuminating the entire field of view. The spot of light from the flying spot scanner 87 is polarized at 81 and passes through the left side optics 70, through the Faraday material 85 and reflected by the reflective film 86 through the right side optics 70, through the analyzer 85 into the photovolt multiplier. The photovolt multiplier device indicated diagrammatically at 88 is of a character well known in the art which, by suitable electronic circuitry employed therewith and of a character well known in the television art, can display the scene being observed on a cathode ray type picture tube. The amount of contrast appearing on the cathode ray tube represents various amounts of magnetic penetration of the detector and hence, the temperature variation of the scene being observed. The magnetic field to which the element is subjected is produced by passing current through the coil generally indicated at 52 in FIGS. 1 and 2 and at 52' of FIG. 3 which surrounds the contained volume in which the detector is disposed or mounted. In the more sophisticated cryostat of FIG. 3, this coil may, if desired, be disposed within the lower bottom portion of the cryostat. In the event that requirements demand a larger field, an external field could be produced by utilization of a solenoid coil of suitable characteristics disposed about the outer periphery of the lower housing. It is further envisioned that in a more refined version of the instant camera tube, the coil used for producing the magnetic field may be fabricated of a superconducting material and so disposed with respect to the detector that a current would be established within it which would in turn produce the desired magnetic field, without further need for outside electric power as long as the superconductor material of the coil is maintained in a superconducting state.

The operation of a camera tube of the instant invention will be described with respect to the diagrammatic illustration of FIG. 2 which while shown is schematic form is directed to a workable superconducting tube.

Liquid nitrogen is contained in the outer Dewar 12 and liquid helium in the inner Dewar 13. Infrared radiation emanates from an incandescent source in a line configuration as shown at 33, the optical element of the lens system generally indicated at 32. The germanium filter 31 transmits light preferably of wavelengths greater than 1.8 microns. This energy as reflected by a half-silvered mirror 29 is imaged down into the cryostat through the lens indicated at 28 and by passage through the transparent closure of the Dewar indicated at 25. The infrared radiation penetrates the cerium metaphosphate glass at 85 (the Faraday material), goes through the germanium reflective film 86 on the bottom surface of this glass and is absorbed by the mosaic elements 83 of the detector assembly 11. Although the embodiment herein described is directed to the use of a germanium reflective film, it is to be understood that other reflective films may be utilized in the practice of the instant inventive concept. In the instant situation, radiation from the infrared source serving as the target can penetrate this film because the infrared energy is of wavelengths greater than 1.8 microns which germanium will transmit. The light from the readout illumination source is of wavelengths of 1.15 microns and less and will not penetrate the germanium reflective film and, thus, can not be absorbed by the detector elements, changing their superconductive state causing them to produce a spurious signal as a target. Visible light for readout emanates from an incandescent light 37 and is passed through a ground glass or water filter 41 so that only visible readout light of wavelengths up to 1.15 microns emanates from this source. This light as collimated by lens 42 is passed through a polarizer 43 and is reflected by the half-silvered mirror 34 into a passage through the second front surface mirror 29 and the focusing system 28 substantially corresponds to the path having a common axis therewith and emanating from a source 33. The visible light passes through the cerium metaphosphate glass at 85 and is reflected off the germanium reflective coating 86 or other reflective film coating as may be utilized at the bottom of the glass. The light then goes back up the cryostat, through appropriate optics indicated at 28, passes through the analyzer or light polarizing filter 35, the polarization axis of which is rotated at 90° with respect to the polarizer 43. The image thus passed can be observed visually on a ground glass screen, not shown, or projected into a camera for photographic recording. The analyzer is generally indicated at 35. A constant magnetic field is maintained in the area of the detector by passing a suitable current through the coil 52 contained in the outer liquid nitrogen Dewar 12. The temperature of the detector is maintained constant by pumping on the liquid helium as indicated at 17 by use of a vacuum pump 44, connected by piping generally indicated at 45, and maintaining a constant pressure in the inner Dewar by means of a Cartesian manostat and mercury manometer device not shown but of a character well known in the art and inserted through suitable valves and connections in tube 45. Referring again to the enlarged sectional view of the detector assembly 11 as shown by FIGS. 4, 5 and 6, cerium metaphosphate glass 85 is shown as being coated on the bottom surface with a film of germanium or other reflective film at 86. The mosaic detector 83, which is made of a superconducting material such as tin, is mounted on the top of a metal block 84, which may be copper, by means of an insulating film 75, such as an epoxy resin of approximately 0.007 inch in thickness which produces a bond between these elements of structure. The elements of the mosaic may, if desired, be cubic in shape and while the dimension of 0.040 inch cubic elements spaced 0.010 inch apart have been used to demonstrate the principle of operation of this device, actually smaller elements will give greater sensitivity and better resolution. The metal support block is cooled by immersing it in liquid helium in a controlled pressure atmosphere and hence, it is maintained at a constant temperature. The purpose of the insulator is to permit the elements of the mosaic that are subjected to infrared energy to rise in temperature and maintain their "heated condition" until readout is effected before they return to an equilibrium condition. The infrared energy passes through the germanium or other suitable film coating on the bottom of the cerium metaphosphate glass, strikes the top surface of the tin and is absorbed. The visible light is reflected by the germanium surface. Conditions are caused to prevail under which the mosaic detector is in its superconducting state and in a magnetic field which is just slightly less than the critical field when no infrared energy is imaged onto the detector. This situation is considered at point (a) in FIG. 15. While maintaining the applied magnetic field at a constant valve infrared energy is imaged onto the detector and the full field of view is subjected to the readout light. The elements which become heated undergo a transition from the superconducting to the normal state or somewhere within the transition region, and allow the magnetic field to penetrate them. In these areas, the polarized readout light will be rotated and will appear light when viewed by the human eye. All other areas where the magnetic field has not penetrated will appear dark to the observer since the polarized light is not rotated in these regions. Thus, the thermal image can be produced and absorbed by using this technique. In the embodiment of FIG. 3, after the complete mosaic has been scanned by the flying spot scanner for readout, the magnetic field is cycled as shown in FIG. 16 in a manner which erases the image and prepares the detector again to receive an image, shown as a condition of FIG. 16.

It is thus apparent that an improved infrared camera pickup tube has been disclosed. The terminology utilized throughout the specification is intended to be used as terms of art and not in a limiting sense.

Obviously many modifications and variations of the present invention are possible in the light of the above teachings. It is therefore to be understood that within the scope of the appended claims the invention may be practiced otherwise than as specifically described.

What is claimed is:

1. The improved method of detecting electromagnetic energy intelligence in imageable form of frequency bandwidths in the infrared spectral region comprising the steps of:
   focusing a light beam containing imageable intelligence upon a sensitive detection surface of a detector element of a superconducting character displaying change of physical state characteristics;
   establishing and maintaining the detection surface at a temperature region corresponding substantially to the superconductive state thereof;
   during the phase of detecting the imaged intelligence, subjecting the detecting element to an electromagnetic field, the value of which is below the critical field of that element in the absence of imageable intelligence;
   erasing the imaged intelligence by cycling the electromagnetic field surrounding the element;
   contemporaneously impinging upon the detection surface, an irradiating polarized light beam in addition to the light beam containing the image to be detected;
   changing the polarization of the electromagnetic light beam reflected from the impinged surface of said detection element; and
   providing for a visible readout of the imaged intelligence by observation of only that portion of the reflected light beam which has undergone a change in polarization due to the light beam irradiating the detection surface.

2. The method of claim 1, further including the step of passing the reflected light beam through a light polarization device of a character differing in its polarization characteristics from that of the aforementioned polarized light beam by a phase difference corresponding to the phase shift effected by the detector element in shifting the phase of polarization of the light beam reflected therefrom and only in the presence of imaging irradiation.

3. The method of claim 2 further comprising the step of presenting the observable visual readout image to a television type camera pickup tube for ultimate presentation and observation on a television and/or cathode ray oscillograph display tube type indication device.

4. The method of claim 2 further comprising the step of presenting the observable visual image for readout in incremental form corresponding to a predetermined sequence of scanning of the image reflected by the detection surface of the detection element.

5. The method of claim 4 further including the step of scanning the detection surface of the detector element with a flying spot scanner.

6. The method of claim 5 including the further step of amplifying the sequentially scanned observable image of incremental intelligence in light energy signal form by causing impingement of the intelligence signals upon a photomultiplier tube for electrical signal output therefrom.

7. The method of detecting and presenting for viewing infrared image intelligence signals comprising the steps of optically focusing a beam of light containing image intelligence onto a detection surface of a detector element of a superconducting character;
   changing the physical state of the detection surface by subjecting the detector element to an electromagnetic field;
   reflecting the beam of light from a portion of said detector element;
   reading out the detected image intelligence by causing a beam of polarized light to contemporaneously impinge upon and be reflected by the detection surface whereby a shift in phase of the polarization of the reflected light will be indicative of the portion of the readout beam to be viewed in which imaging intelligence is distinguishable from background signal intelligence; and
   establishing and maintaining a detection surface at a temperature substantially corresponding to the superconducting state thereof.

8. An infrared radiation sensitive television camera tube device of the character described comprising:
   a cryostat having a plurality Dewar chambers for maintaining a predetermined temperature in the interior of the device;
   means comprising a detection surface of a superconductive character displaying change of physical state characteristics;
   means comprising an electrically energizable coil for providing a magnetic field having a flux path penetrating said detection surface;
   means including a light source and an optical system for light beam polarization;
   means for providing for impingement of polarized light onto said detection surface;
   means for passing polarized light of a polarity differing in phase from that of the first mentioned light beam polarization means and for attenuation of polarized light corresponding in phase to that of said first mentioned light polarization means; and
   means for converting light image signal intelligence passed by said last mentioned light polarization means for deriving electrical signal intelligence of a character adapted for presentation on the screen of a cathode ray indicating device.

9. An apparatus of claim 8 wherein said illuminating beam path means comprises:
   a light polarizer disposed between the light source and the detection means and a beam reflecting means of a character for reflecting light passing thereon from one direction and for transmission of light energy arriving thereon from a direction normal to said first light path.

10. An infrared radiation sensitive image pickup and readout type camera tube of the character described comprising in combination:
    a cryostat for maintaining a predetermined temperature level in the interior thereof;
    means comprising a detection device having a detection surface of a superconducting character;
    means providing a magnetic field about and through said detection surface as contained in said cryostat;
    means including a light source for irradiating said detection surface;
    plurality of light beam polarization means with a first one thereof disposed between said irradiating light source and said detection surface and a second one thereof disposed in the path of a light beam reflected from said detection surface;
    means capable of presenting a viewable image for signal intelligence readout, said last mentioned means being characterized by permitting passage therethrough only of polarized light of a polarity differing in phase from that of the light passed by said first one of said light beam polarization means; and
    optical means for focusing imaging signal intelligence onto said detection surface and at an angle with respect to said surface of a degree providing for reflection of substantially all of the light rays impinging thereon.

11. The apparatus of claim 10 further including in combination:
    means for converting optically focused light beam image intelligence into electrical signal intelligence of a character adapted for presentation for viewing on a television type cathode ray tube.

12. The apparatus of claim 11 further characterized by the light beam to electrical signal converting means comprising a television type camera tube.

13. The apparatus of claim 11 further characterized by the light beam to electrical signal converting means comprising a phototype multiplier tube for light energy to electrical signal conversion; and a flying spot scanner for incrementally sequentially dissecting the light beam containing image intelligence for purposes of synchronization of a television viewing system of a character adapted for utilization therewith.

References Cited

UNITED STATES PATENTS

| | | |
|---|---|---|
| 3,141,974 | 7/1964 | Auphan. |
| 2,967,961 | 1/1961 | Heil. |
| 3,096,431 | 7/1963 | Schmidlin _____ 307—306 |
| 3,138,026 | 6/1964 | Kahn. |
| 3,153,146 | 10/1964 | Lady. |
| 3,193,685 | 7/1965 | Burstein _____ 307—311 |

ROBERT L. GRIFFIN, *Primary Examiner.*

J. A. ORSINO, JR., *Assistant Examiner.*

U.S. Cl. X.R.

178—6, 6.8, 7.2; 250—83.3; 307—306, 311